United States Patent
Rehfuss et al.

[19]

[11] Patent Number: 6,114,444
[45] Date of Patent: Sep. 5, 2000

[54] CURABLE POLYUREAS

[75] Inventors: John W. Rehfuss, West Bloomfield;
Walter H. Ohrbom, Commerce;
Robert J. Taylor, Northville, all of Mich.

[73] Assignee: BASF Corporation, Southfield, Mich.

[21] Appl. No.: 08/287,351

[22] Filed: Aug. 8, 1994

Related U.S. Application Data

[63] Continuation-in-part of application No. 08/098,177, Jul. 27, 1993, abandoned.

[51] Int. Cl.$^7$ .................................................. C08G 18/71
[52] U.S. Cl. ............................ 525/101; 528/21; 528/49; 528/68; 528/254; 528/259; 528/264; 525/157; 525/452; 525/509; 525/518
[58] Field of Search ............................ 528/21, 254, 259, 528/264, 68, 49; 525/101, 157, 452, 509, 518

[56] References Cited

U.S. PATENT DOCUMENTS

| | | | |
|---|---|---|---|
| 4,046,729 | 9/1977 | Scriven et al. | 204/159.11 |
| 4,477,618 | 10/1984 | Singer et al. | 524/157 |
| 4,859,743 | 8/1989 | Ambrose et al. | 525/443 |

*Primary Examiner*—Rachel Gorr
*Attorney, Agent, or Firm*—Anna M. Budde

[57] ABSTRACT

Coating compositions are described comprising:
(A) a polyurea reaction product of a mixture comprising:
  (1) a polyisocyanate, and
  (2) ammonia, ammonium hydroxide, an aliphatic or cycloaliphatic primary amine, a hydrazide, aziridine, or water, and
(B) a compound having a plurality of functional groups that are reactive with urea groups on said polyurea.

28 Claims, No Drawings

CURABLE POLYUREAS

This is a continuation-in-part of U.S. patent application Ser. No. 08/098,177 filed on Jul. 27, 1993, now abandoned.

FIELD OF THE INVENTION

This invention relates to curable compositions, especially curable coating compositions, particularly acrylic compositions.

BACKGROUND OF THE INVENTION

Curable polyurea compositions for coating and/or molding are well-known in the art. They provide a number of desirable characteristics such as hardness, low temperature curability, mar resistance and low cost.

The most commonly used curable polyureas are based on urea formaldehyde resin. Many such polyurea compositions have been found to be unsuitable for exterior coatings, exhibiting poor durability upon prolonged exterior exposure.

It has thus long been desired to produce a composition that exhibits many of the advantages of polyureas, while still providing adequate exterior durability.

SUMMARY OF THE INVENTION

There is provided according to the present invention a curable coating composition comprising:
(A) a polyurea reaction product of a mixture comprising:
  (1) a polyisocyanate, and
  (2) ammonia, ammonium hydroxide, an aliphatic or cycloaliphatic primary amine, a hydrazide, aziridine, or water, and
(B) a compound having a plurality of functional groups that are reactive with urea groups on said polyurea.

DESCRIPTION OF THE PREFERRED EMBODIMENTS

The polyurea used in the practice of the present invention is the reaction product of a polyisocyanate and ammonia, ammonium hydroxide, or a primary amine. The polyisocyanate has at least two isocyanate groups, and preferably no more than six. Illustrative examples of useful polyisocyanates include monomeric polyisocyanates, such as monomeric diisocyanates of hydrocarbons, preferably hydrocarbons having from from 6 to 18 carbon atoms (e.g., isophorone diisocyanate, trimethylhexamethylene diisocyanate, dicyclohexylmethane diisocyanate, and toluene diisocyanate) or triisocyanates such as 1,2,4-benzene triisocyanate; isocyanurates and biurets of monomeric isocyanates, such as the isocyanurate of isophorone diisocyanate, the isocyanurate of hexamethylene diisocyanate, or the biuret of hexamethylene diisocyanate; oligomers or prepolymers containing isocyanate groups; and isocyanate-terminated polyurethanes or polyureas.

Polymers containing isocyanate groups, such as oligomers, prepolymers, or polymers of isocyanates (e.g., m-isopropyl-α,α-dimethylbenzyl isocyanate) may be formed by the reaction of an excess of polyisocyanate equivalents with a polymeric or oligomeric compound containing more than one isocyanate-reactive group (e.g., active hydrogen). Examples of useful compounds containing more than one isocyanate-reactive group include polyols (e.g., alkyl polyols, polyester polyols, polyether polyols, and acrylic polyols) and polyamines. Other polymeric polyisocyanates may be derived by polymerizing isocyanate-containing monomers, such as unsaturated m-isopropenyl-α,α-dimethylbenzyl isocyanate. (sold by American Cyanamid as TMI™). Alternatively, an isocyanate-containing monomer, such as TMI®, may be reacted with ammonia, ammonium hydroxide, or a primary amine to form a urea-containing monomer. This monomer can then be polymerized to form a urea-functional polymer.

Isocyanate-terminated polyurethanes are well-known in the art, and may be formed by reacting a polyol (e.g., alkyl polyols, polyester polyols, polyether polyols, and acrylic polyols) with an excess of a polyisocyanate such as any of the above-described diisocyanates. Isocyanate-terminated polyureas may be formed by reacting a polyamine (e.g., 1,3-pentane diamine or other alkyl polyamines, polyether polyamines such as Jeffamine™, or aryl polyamines, as are known in the art) or water with an excess of a polyisocyanate such as any of the above-described diisocyanates. Useful isocyanate-terminated polyurethanes or isocyanate-terminated polyureas can have number average molecular weights in the range of 300 to 6000.

The polyisocyanate is reacted with ammonia, ammonium hydroxide, an aliphatic or cycloaliphatic primary amine, a hydrazide, aziridine, or water to convert the isocyanate groups to urea functional groups that will react with component (B) during cure. Reaction with ammonia or ammonium hydroxide will produce a terminal primary urea functional group, and is preferred. Reaction with a primary amine or water will produce a secondary urea functional group. This secondary urea group may be a terminal urea group (in the case of reaction with a compound having a single primary amine group) or it may be a chain-extension urea group (in the case of reaction with a polyamine or water). Useful aliphatic or cycloaliphatic primary amines that can be reacted with the isocyanate groups include butyl amine, cyclohexyl amine, and the like. The aliphatic or cycloaliphatic portion of the amine may be substituted with substituents such as carboxyl phenyl that are normally regarded as non-reactive with isocyanate. Non-amine isocyanate-reactive substituents such as hydroxyl should be avoided as they will form urethane groups instead of the desired urea groups. The reaction with water is followed by removal of $CO_2$, and subsequent reaction with another isocyanate group (either on a polyisocyanate to produce chain-extended polyureas or on a monoisocyanate to produce a terminal secondary urea). The reaction of the polyisocyanate with component (A)(2) can be conducted under atmospheric or positive pressure at temperatures of 0° C. to 50° C.

The composition of the invention is cured by a reaction of the polyurea (A) with a compound (B) that is a compound having a plurality of functional groups that are reactive with the urea groups on (A). Such reactive groups include active methylol or methylalkoxy groups on aminoplast crosslinking agents or on other compounds such as phenol/formaldehyde adducts, acrylamide groups, isocyanate groups, siloxane groups, cyclic carbonate groups, and anhydride groups. Examples of (B) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), polymers having acrylamide groups, polymers having methylol or alkoxymethyl groups, and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. Pat. No. 5,300,328.

A solvent may optionally be utilized in the curable composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the urea-functional component (A) as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of aqueous co-solvents.

The curable composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

In a preferred embodiment of the invention, the composition of the invention is utilized as a coating composition. In such a composition, the solvent may be present in the composition of the invention in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

The coating composition according to the present invention may be used either as a pigmented paint coating composition or as the clearcoat of a color-plus-clear composite coating.

When the coating composition of the invention is used as a pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A and B (i.e., a P:B ratio of 0.1 to 1).

When the composition of the invention is used as the clearcoat of a composite color-plus-clear coating, the pigmented basecoat composition for such a composite coating may be any of the types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The composition of the invention is generally heat-cured by exposing it to elevated temperatures. Curing temperatures will vary depending on the particular blocking groups used in the cross-linking agents, however they generally range between 93° C. and 177° C., and are preferably between 121° C. and 141° C. The curing time will vary depending on the particular components used, and physical parameters such as the thickness of the layers (in the case of a coating). Typical curing times for coatings range from 15 to 60 minutes.

The invention is further described in the following examples.

Preparation 1A—Isocyanate-Functional Acrylic Polymer

A reactor, charged with 591.1 parts of butyl acetate and 201.1 parts propylene glycol monomethyl ether acetate was heated under inert atmosphere to reflux (129° C. to 133° C.). Once at reflux, the inert atmosphere was turned off and 24.3 parts of refluxed mixture was removed. 1331.4 parts TMI™ (1-(1-isocyananto-1-methyl ethyl)-4-(1-methyl ethenyl) benzene), 869.7 parts ethyl hexyl acrylate, 366.8 parts of a 50% solution of t-butyl-peroxyacetate in odorless mineral spirits, 39.3 parts of aromatic S100™ solvent, and 37.9 parts of butyl acetate was then added at reflux over 3.45 hours. Then, 36.7 parts of a 50% solution of t-butylperoxyacetate in odorless mineral spirits and 36.7 parts of aromatic S100™ was added at reflux over 30 minutes. The reaction mixture was kept at reflux for additional hour. During this time, 50.7 parts of propylene glycol monomethyl ether acetate was added. The product had a theoretical non-volatile of 66.9%, and a isocyanate equivalent weight of 546 g/eq on solution.

Preparation 1B—Urea-Functional Acrylic

A reactor was charged with 337.1 parts of a 56% aqueous ammonium hydroxide solution. Keeping the temperature of the reaction mixture below 35° C., 1673.4 parts of Preparation 1 was then added over 70 minutes. During the add of Preparation 1, 206.3 parts of toluene was charged to the reactor, followed with additional 169.5 parts of toluene at the end of the add. The reaction mixture was then heated to reflux (maximum reflux temperature 110° C.) under inert atmosphere flow, and a total of 515.1 parts of the refluxed reaction mixture was removed. The product had a non-volatile of 72.2%, primary urea theoretical weight of 574.7 g/eq on solution, number average molecular weight of 972 Daltons, weight average molecular weight of 1789 Daltons.

Preparation 2—Urea-capped Polyurethane

A reactor, charged with 300.5 parts of propylene glycol monomethyl ether acetate and 25.8 parts of toluene, was heated under inert atmosphere to reflux (140° C. to 143° C.). Once at reflux, the inert atmosphere was turned off and 26.6 parts of the refluxed reaction mixture was removed. The system was then cooled under inert atmosphere to below 30° C. 527.3 parts of isophorone diisocyanate was then added. The system was heated to 42° C. under inert atmosphere and 0.3 parts of dibutyl tin dilaurate was added. 175.5 parts 2-ethyl-1,3-hexanediol was then added over 50 minutes. During this addition, temperature of the reaction was allowed to reach 59° C. The reaction mixture was then held at 60° C. for 50 minutes, then at 80° C. for 30 minutes. The reaction mixture was then cooled to 16 C. NH$_3$ gas was then bubbled through the reaction mixture. During the addition of NH$_3$ gas, the temperature was allowed to vary from 7° C. to 62° C., and 306.1 parts of propylene glycol monomethyl ether was added. The reaction mixture was then held at 70° C. until the isocyanate equivalent weight was greater than 40,000 g/eq. 100.9 parts of propylene glycol monomethyl ether and 101 parts of n-butanol were then added. The product had a theoretical non-volatile of 47.9% and a theoretical primary urea equivalent weight of 691 g/eq on solution.

EXAMPLES 1–2

Preparations 1B and 2 are combined with a solvent, a melamine formaldehyde resin curing agent, and a strong acid cure catalyst to form a coating composition. This composition is applied onto a glass substrate, and subjected to vacuum draw-down. The compositions are then bake-cured to form a hard coating.

The invention has been described in detail with reference to preferred embodiments thereof. It should be understood, however, that variations and modifications can be made within the spirit and scope of the invention.

What is claimed is:

1. A pigmented curable paint composition comprising:
    (A) a polyurea having terminal urea groups that is a reaction product of a mixture comprising:
        (1) a polyisocyanate, and
        (2) ammonia, ammonium hydroxide, an aliphatic or cycloaliphatic primary amine that is free from non-amine isocyanate-reactive substituents, a hydrazide, aziridine, or water,
    (B) a compound having a plurality of functional groups that are reactive with ureas groups on said polyurea, and
    (C) a pigment.

2. A pigmented curable paint composition according to claim 1 wherein the polyisocyanate is a monomeric diisocyanate of a hydrocarbon.

3. A pigmented curable paint composition according to claim 1 wherein the polyisocyanate is a trifunctional isocyanurate of a diisocyanate.

4. A pigmented curable paint composition according to claim 1 wherein the polyisocyanate is an isocyanate-functional acrylic polymer.

5. A pigmented curable paint composition according to claim 1 wherein the polyisocyanate is an isocyanate-terminated polyurethane having a molecular weight of 300 to 6000.

6. A pigmented curable paint composition according to claim 1 wherein component (A)(2) is ammonia.

7. A pigmented curable paint composition according to claim 1 wherein component (A)(2) is ammonium hydroxide.

8. A pigmented curable paint composition according to claim 1 wherein component (A)(2) is an aliphatic or cycloaliphatic primary amine.

9. A pigmented curable paint composition according to claim 1 wherein the compound B is an aminoplast.

10. A pigmented curable paint composition according to claim 9 wherein the aminoplast is a melamine formaldehyde resin.

11. A pigmented curable paint composition according to claim 9 wherein the aminoplast is a urea formaldehyde resin.

12. A composite color-plus-clear coating comprising a pigmented basecoat and a clearcoat, said clear coat being derived from a coating composition comprising:
    (A) A polyurea having terminal urea groups that is a reaction product of a mixture comprising:
        (1) a polyisocyanate, and
        (2) ammonia, ammonium hydroxide, an aliphatic or cycloaliphatic primary amine that is free from non-amine isocyanate-reactive substituents, a hydrazide, aziridine, or water,
    (B) A compound having a plurality of functional groups that are reactive with urea groups on said polyurea.

13. A composite coating according to claim 12 wherein the polyisocyanate is a monomeric diisocyanate of a hydrocarbon.

14. A composite coating according to claim 12 wherein the polyisocyanate is a trifunctional isocyanurate of a diisocyanate.

15. A composite coating according to claim 12 wherein, the polyisocyanate is an isocyanate-functional acrylic polymer.

16. A composite coating according to claim 12 wherein the polyisocyanate is an isocyanate-terminated polyurethane having a molecular weight of 300 to 6000.

17. A composite coating according to claim 12 wherein component (A)(2) is ammonia.

18. A composite coating according to claim 12 wherein component (A)(2) is ammonium hydroxide.

19. A composite coating according to claim 12 wherein component (A)(2) is an aliphatic or cycloaliphatic primary amine.

20. A composite coating according to claim 12 wherein the compound B is an aminoplast.

21. A composite coating according to claim 20 wherein the aminoplast is a melamine formaldehyde resin.

22. A composite coating according to claim 20 wherein the aminoplast is a urea formaldehyde resin.

23. A pigmented curable paint composition as described in claim 1, wherein the paint composition is a non-aqueous composition.

24. A pigmented curable paint composition as described in claim 1, wherein the paint composition is a solvent based composition.

25. A pigmented curable paint composition as described in claim 1, wherein the paint composition is a powder based composition.

26. A composite color-plus-clear coating as in claim 12, wherein the coating composition is a non-aqueous coating composition.

27. A composite color-plus-clear coating as in claim 12, wherein the coating composition is a solvent based coating composition.

28. A composite color-plus-clear coating as in claim 12, wherein the coating composition is a powder based coating composition.

* * * * *